Figure 1:
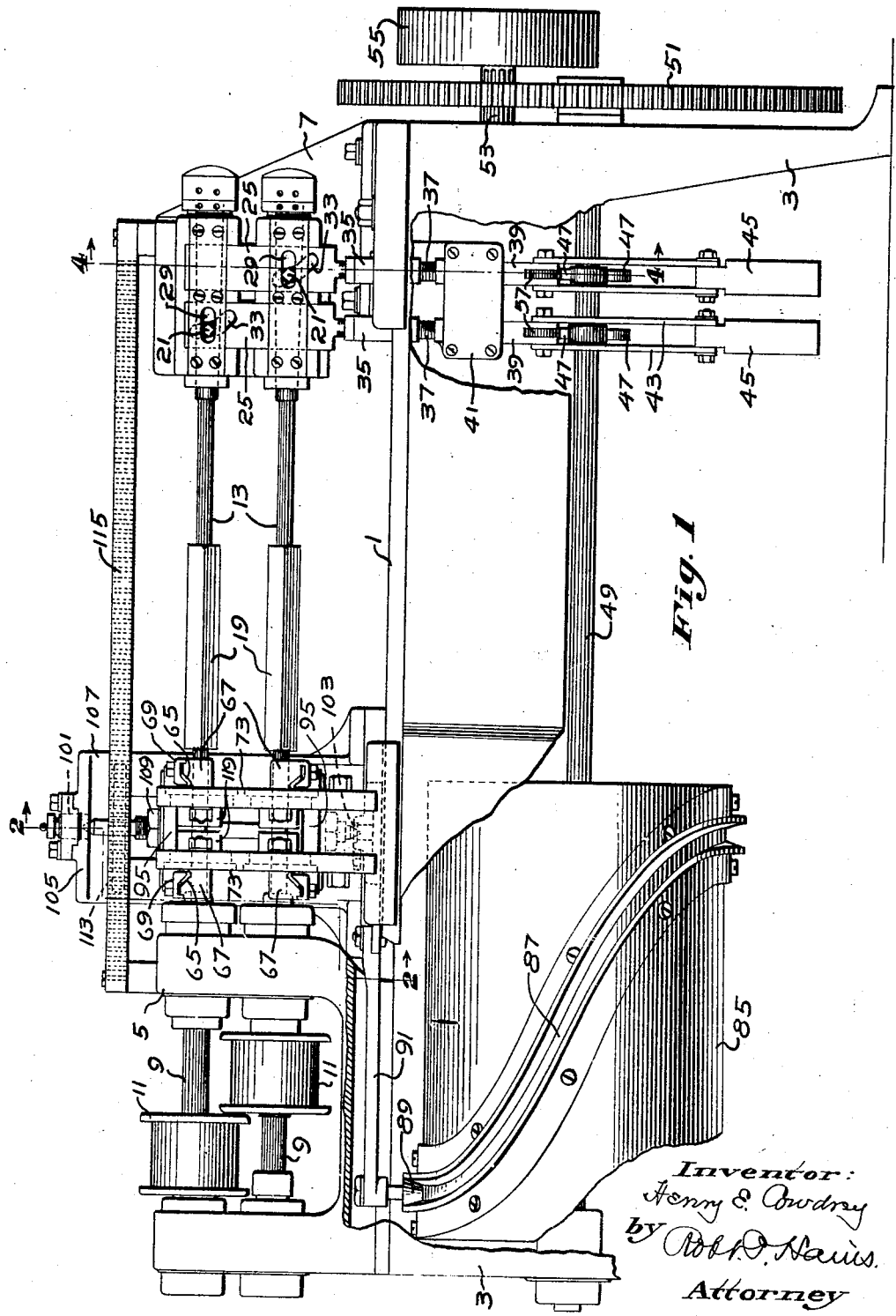

H. E. COWDREY.
WOODWORKING MACHINE.
APPLICATION FILED JAN. 5, 1918.

1,319,046.

Patented Oct. 21, 1919.
4 SHEETS—SHEET 1.

Inventor:
Henry E. Cowdrey
by Rob't D. Harris
Attorney

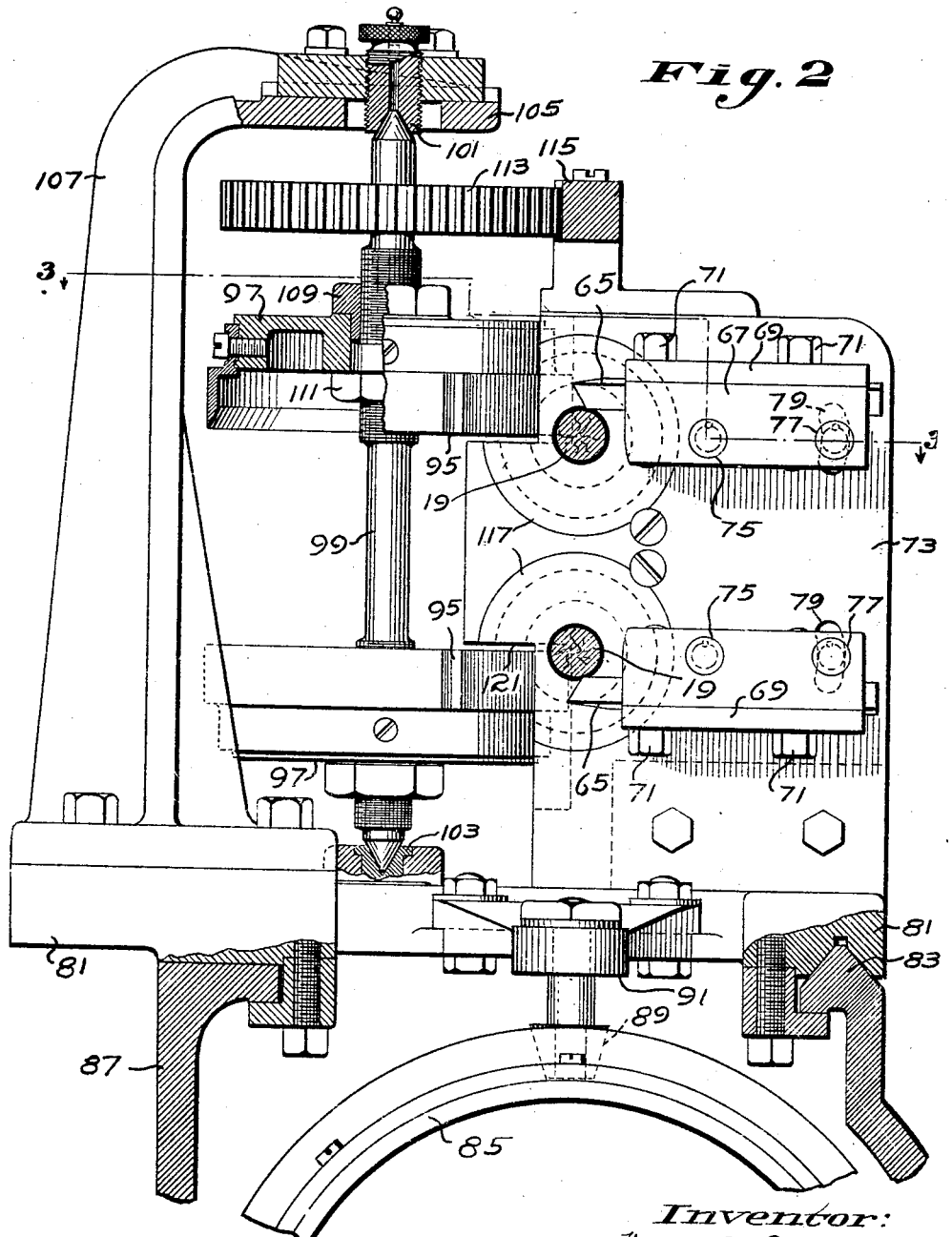

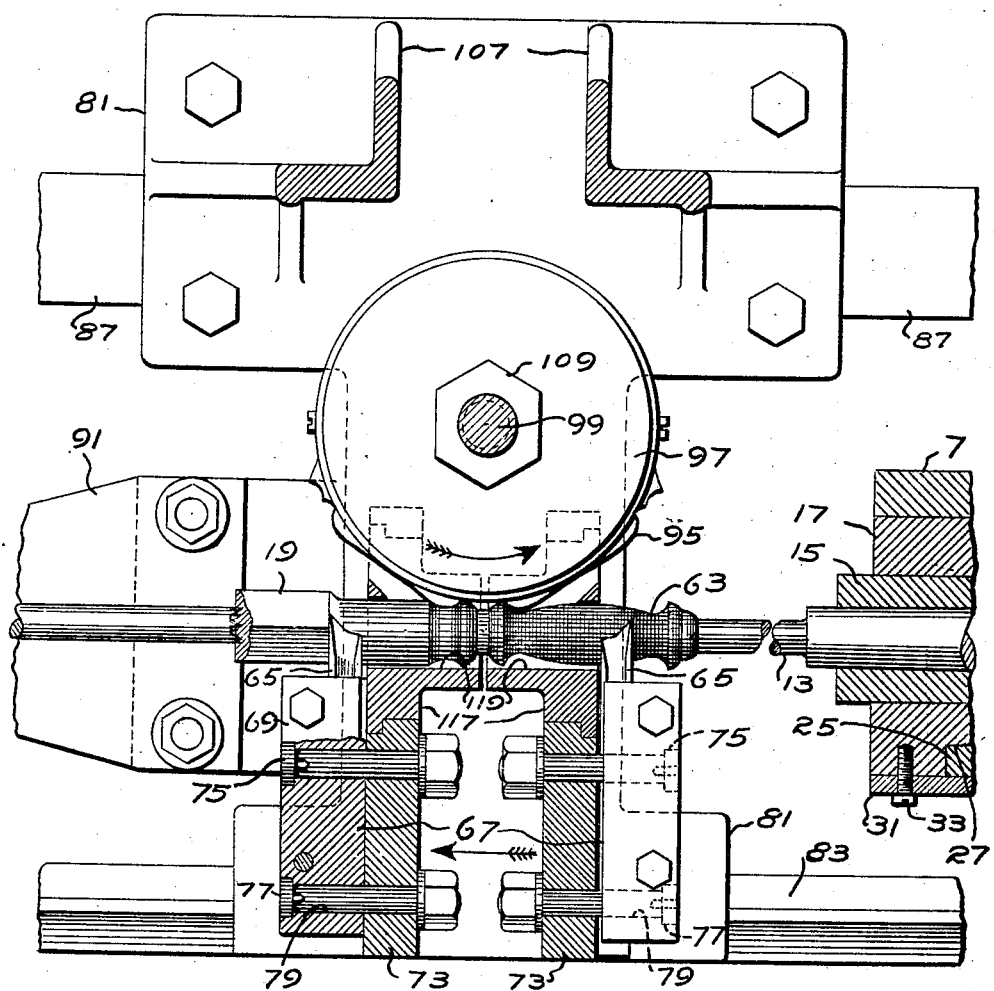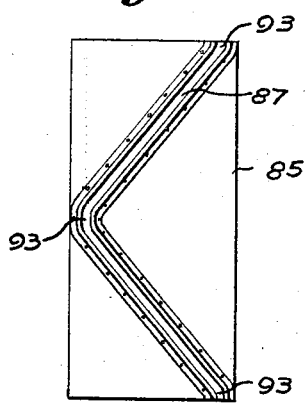

H. E. COWDREY.
WOODWORKING MACHINE.
APPLICATION FILED JAN. 5, 1918.

1,319,046.

Patented Oct. 21, 1919.
4 SHEETS—SHEET 4.

Inventor:
Henry E. Cowdrey,
by Robt. P. Hains.
Attorney

UNITED STATES PATENT OFFICE.

HENRY E. COWDREY, OF FITCHBURG, MASSACHUSETTS.

WOODWORKING-MACHINE.

1,319,046. Specification of Letters Patent. Patented Oct. 21, 1919.

Application filed January 5, 1918. Serial No. 210,430.

*To all whom it may concern:*

Be it known that I, HENRY E. COWDREY, a citizen of the United States, and resident of Fitchburg, county of Worcester, and State of Massachusetts, have invented an Improvement in Woodworking-Machines, of which the following description, in connection with the accompanying drawings, is a specification, like characters on the drawings representing like parts.

The invention hereinafter described relates to wood working machines and more particularly to lathes for shaping tool handles, furniture parts and other articles.

Lathes for this purpose usually comprise a bed having head and tail stocks provided with spindles for receiving and rotating the pieces of stock to be shaped to the desired form. A reciprocatory carriage has been mounted on the bed carrying a tool for performing a preliminary operation on the stock, such, for example, as reduction of the stock from rectangular to cylindrical form, and a rotary pattern tool has been mounted on the carriage to follow the first tool and produce beads, moldings or other form on a cylindrical piece of stock according to the pattern of the tool.

Heretofore, the tools have acted on the stock while the carriage is fed in one direction; the finished piece of stock has then been removed from the spindles and the carriage returned to its original position in readiness to feed again in the same direction as before, and shape the next piece of stock introduced between the spindles. The output of the machine has been objectionably limited because the machine was unproductive during the idle or return feed of the carriage between its successive active operations. One of the purposes of the present invention is to provide a machine which will shape stock while it is fed in both directions, thereby eliminating the idle or return feed and doubling the output of the machine.

Another object of the invention is to provide a plurality of sets of tools which may simultaneously shape a plurality of pieces of stock when fed in each direction, and thereby further multiply the output of the machine.

And still another object of the invention is to provide simple and effective means for automatically releasing the pieces of stock after they have been shaped by the tools, and providing for the introduction of the succeeding piece of stock to be shaped.

With the aforesaid and other objects in view, the character of the invention may be best understood by reference to the following description of one good form of the invention shown in the accompanying drawings, wherein:—

Figure 4:
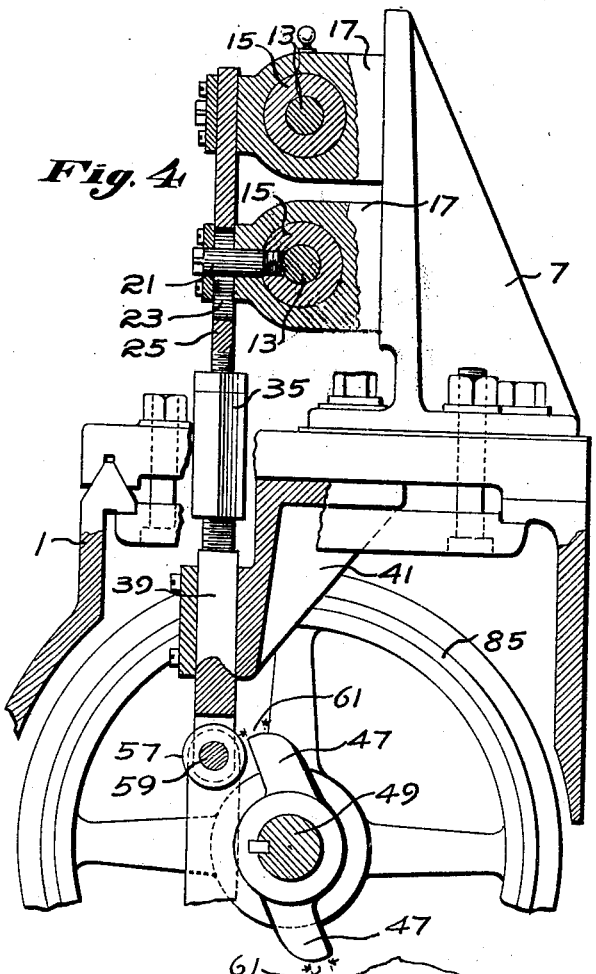
Figure 5:
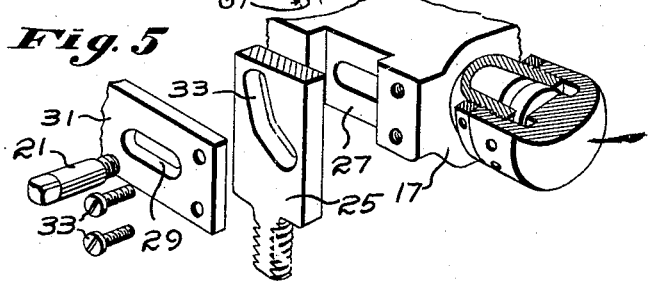

Figure 1 is a front elevation of the machine shown herein as embodying the invention;

Fig. 2 on an enlarged scale is a vertical section showing the tool carriage and tools;

Fig. 3 is a horizontal section taken on line 3—3 of Fig. 2;

Fig. 3ª is a development of the cam for reciprocating the tool carriage;

Fig. 4 on an enlarged scale is a vertical section taken on line 4—4 of Fig. 1; and Fig. 5 is a perspective view of details of the means for moving the tail stock spindles to their positions for gripping and releasing the stock.

Referring to the drawings, the machine shown therein to illustrate the invention, comprises a bed 1 (Fig. 1) mounted on legs 3, supporting a head stock 5 and a tail stock 7. The head stock, in the present instance of the invention, has a pair of spindles 9 journaled in bearings therein adapted to be rotated by suitable means, such, for example, as pulleys 11 driven by belts from any suitable source of power.

The tail stock, in the present instance of the invention, supports a pair of spindles 13 mounted in sleeves 15 (Fig. 4) in bearings 17 projecting laterally from the tail stock. The tail stock spindles have center points and the head stock spindles have center points and projections for gripping and rotating the pieces of stock 19. While a pair of head stock spindles and a pair of tail stock spindles have been shown herein, it will be understood that the number thereof may be varied as desired.

The tail stock spindles may be adjusted in the direction of their axes toward and from the head stock spindles to grip and release the pieces of stock. To accomplish this, in the present instance of the invention, the bearing sleeves 15 for the tail stock spindles may have followers conveniently in the form of pins 21 (Figs. 1, 4 and 5) tapped into said sleeves and coöperating with camways or slots 23 in bars or members 25 adapted to slide vertically in grooves 27 in the bearing 17. The pins project from said cam slots into horizontal slots 29 in cover plates 31 secured to the front faces of said bearings by suitable screws 33. The bars 25 may have studs projecting from their lower ends connected by elongated nuts 35 with studs 37 having squared portions 39 reciprocable in brackets 41 secured to and depending from the bed. The lower ends of the studs 39 may be connected by pairs of links 43 with weights 45 or equivalent means which tend to shift the cam bars 25 downward. The shape of the cam slots 23 in the bars 25 is such that when said bars are drawn downward by said weights, the pins 21 and perforce the tail stock spindles will be shifted toward the head stock spindles and press against the pieces of stock and hold the same between the head and tail stock spindles, and when the bars 25 are shifted upward, the cam slots 23 will act on the pins and withdraw the tail stock spindles from the pieces of stock and release the same. Suitable means may be provided to shift the bars upward for this purpose. In the present instance, this means comprises pairs of cams 47 (Figs. 1 and 4) fast on a horizontal shaft 49 journaled in bearings in the frame beneath the bed and driven by a large gear 51 driven in turn by a pinion 53 on a shaft journaled in a bearing in the frame, and having a pulley 55 fast thereon adapted to be driven by a belt from any suitable source of power.

The cams 47 are adapted to engage rollers 57 on pins 59 carried by the studs 39 connected to the bars 25 as described. The construction is such that the pair of cams for each bar will engage the roller 57 and shift the bar upward to release the tail stock spindles from the pieces of stock twice in each complete rotation of the shaft 49, and each cam is formed with an arcuate portion 61 of uniform radius to hold the spindles in retracted position for a period of dwell sufficiently long to allow time to introduce fresh pieces of stock between the spindles after the removal of the preceding pieces of stock.

Having described the means for holding, rotating and releasing the pieces of stock, next will be described the tools for operating on the pieces of stock as they are rotated to shape the same as required. In the present instance of the invention, the tools shown are adapted to reduce the pieces of stock such as 19 (Fig. 1) from rectangular cross section to circular cross section, and then to turn the cylindrical stock to produce handles 63 (Fig. 3). It will be understood that the handle is selected merely as one form of article which may be produced by the machine, and that articles of various other forms may be produced as desired.

To perform a preliminary operation, such, for example, as the reduction of the stock from rectangular to cylindrical form, when the tool carriage is fed in both directions, a pair of tools 65 (Figs. 1, 2 and 3) may be provided, in the present instance, said tools being of suitable form to reduce the stock to its cylindrical form. These tools are mounted on blocks 67 and secured therein by plates 69 and screw bolts 71. The blocks may be mounted on rests 73, and preferably are adjustably connected thereto to position the tools to produce the depth of cut in the stock desired, and to take up wear on the tool, and to compensate for reduction of the tool from the sharpening thereof from time to time. In the present instance, the blocks are pivotally mounted on bolts 75 secured to the rest, and are secured by bolts 77 secured to said rest and entered through curved slots 79 in said blocks, the construction being such that the blocks may be rocked on the bolts 75 as fulcra and held in the position required. The tool rests may be mounted on a carriage 81 adapted to travel along guide rails 83 mounted on the bed.

Suitable means may be provided to reciprocate the carriage and cause the tools to be fed along the stock held between the spindles in the direction of the axis of the stock. To accomplish this, in the present instance, a cylinder 85 (Figs. 1 and 2) may be provided mounted fast on the shaft 49, referred to, and having a cam way 87 therein receiving a follower 89 connected by an arm 91 with the carriage. A development of the cam is shown in Fig. 3ª, the form of the cam being such that in one complete rotation of the cylinder, the carriage is caused to make one complete reciprocation to travel from its position shown in Fig. 1 to the right of said figure, and then return the same to its position shown in Fig. 1. The cam way may be formed with portions 93 for causing the carriage to dwell at the ends of its reciprocation for a period sufficient to allow the tail stock spindles to be held retracted and permit the introduction of pieces of stock between the spindles. The cams 47, referred to, are mounted on the shaft 49 in positions such that the arc portions 61 thereof will hold the bars 25 elevated and the tail stock spindles retracted while the follower 89 is traveling through the portions 93 of the cam way.

When the carriage is fed to the left of Fig. 1, one of the tools will engage the stock and reduce the same from rectangular to cylindrical form, but the other tool will follow along the stock without performing any operation thereon. However, when the carriage is fed to the right of Fig. 1, the formerly idle tool will reduce the next piece of stock from rectangular to cylindrical form, and the formerly active tool will then be idle and follow along the stock without operating thereon. As a consequence, the tools are alternately operable to reduce successive pieces of stock, and stock is reduced during each travel of the carriage without the idle return movement of the carriage, referred to, thereby desirably increasing the output of the machine. A plurality of sets of tools 65 may be provided, in the present instance of the invention, two sets being shown, for simultaneously reducing two pieces of stock when the carriage travels to the right, and simultaneously reducing two pieces of stock when the carriage travels to the left, thereby further adding to the capacity of the machine.

In some cases it may be desired merely to reduce the stock to cylindrical form. The tools described will suffice for this purpose. However, in other cases it may be desired to produce different forms. For example, it may be desired to shape the stock to produce handles, such as the handles 63, referred to. To accomplish this, a suitable tool may be provided, in the present instance of the invention, in the form of a rotary cutter 95 (Figs. 1, 2 and 3) having a cutting contour suitable to produce the form required. This cutter, in the present instance, is secured to a head 97 mounted on a vertical shaft 99 having conical upper and lower ends journaled in bearings 101 and 103, the upper bearing being mounted in an arm 105 projecting laterally from an upright 107 mounted on the carriage 81, and the lower bearing being mounted on the carriage. The cutter head may be adjustably secured to said shaft by nuts 109 and 111 to vary the depth of cut and adjust the cutter to compensate reduction thereof from sharpening of the cutter as required. The cutter may be conveniently mounted on the opposite side of the center line of the spindles from the roughing cutters 65, referred to, and preferably the pattern cutter is located to engage the stock at a point intermediate the roughing cutters. The construction is such that as the carriage is fed in either direction, the pattern cutter will roll along the stock in the direction of the axis thereof and successively present progressive portions of the cutter thereto to produce the contour required. The pattern cutter will roll in one direction when the carriage is fed to the right to shape one piece of stock, and roll in the opposite direction when the carriage is fed to the left to shape another piece of stock. Therefore, the pattern cutter is active in the production of work when the carriage is fed in both directions. A plurality of rotary pattern cutters may be provided, in the present instance, two such cutters being shown which will simultaneously operate on two pieces of stock when the carriage is fed to the right, and simultaneously operate on two other pieces of stock when the carriage is fed to the left.

In some cases the pattern cutters may be used alone to shape the stock, and in other cases they may be used in connection with the roughing cutters, and follow the latter and shape the stock after it has been reduced to cylindrical form thereby. Since each pattern cutter is located to actively engage the stock at a point intermediate each pair of roughing cutters, it will follow one of the roughing cutters when the carriage is fed to the right, and follow the other cutter when the carriage is fed to the left. As a result, a piece of stock will be reduced to cylindrical form and shape during each direction of travel of the carriage.

Suitable means may be provided for causing the pattern cutters to roll along the stock, in the present instance, this means comprises a gear 113 (Fig. 2) fast on the shaft 99 and meshing with a rack bar 115 (Figs. 1 and 2) having its ends secured to the head and tail stocks. The construction is such that as the carriage is reciprocated, the gear 113 will roll along the stationary rack and impart the rotation to the pattern cutters as required.

To contribute to the support of the stock, rests 117 may be provided mounted on the tool rest 73 and having cylindrical bores 119 conforming to the diameter of the stock after it is reduced by the roughing tools from rectangular to cylindrical form. These rests may be located intermediate the pairs of roughing tools, so that after one or the other of the roughing tools has reduced the stock to cylindrical form, the rest may receive the stock and slide along the same. The cylindrical portions of the rests are preferably located substantially opposite the axis of the pattern cutter, so as to desirably support the stock opposite the point of engagement of the cutter therewith. The rests may have recesses 121 formed therein to allow the pattern cutters to project toward and into engagement with the stock, as will be noted in Fig. 2.

It will be understood that the invention is not limited to the specific embodiment shown, but that various deviations may be made therefrom without departing from the spirit and scope of the appended claims.

What is claimed is:—

1. A machine of the character described, comprising in combination, work supporting and rotating means, a pair of roughing tools, one acting on a piece of work when fed in one direction and the other acting on another piece of work when fed in the opposite direction, and a shaping tool located intermediate said roughing tools and acting on the work when fed in both directions.

2. A machine of the class described, comprising, in combination, work supporting and rotating means, two tools, one supported to act on a piece of work when fed in one direction and the other supported to act on another piece of work when fed in the opposite direction, and a shaping tool arranged intermediate the planes of cut made by said two tools and acting on the work when fed in either direction.

3. A machine of the character described, comprising in combination, a head stock spindle and a tail stock spindle for receiving pieces of stock between them and rotating the same, a pair of roughing tools, means to reciprocate said tools, one of said tools being operable on a piece of stock when the tools are fed in one direction and the other of said tools being operable on another piece of stock when the tools are fed in the opposite direction, and a pattern cutter reciprocable with said roughing tools and operable on the stock on the operation of each of said roughing tools.

4. A machine of the character described, comprising in combination, a work support for receiving and rotating pieces of stock, a tool support, means for reciprocating one of said supports relatively to the other, two roughing tools and a rotary pattern tool mounted on the tool support, the active portion of the rotary pattern tool being between the active portions of the roughing tools and adapted to roll along the stock to shape the same during relative movements of the two supports in either direction.

5. In a machine of the class described, the combination of head and tail stock spindles, a tool support, two roughing tools on said tool support, means for reciprocating the tool support to effect the roughing action of one tool on the work while moving in one direction and the roughing action of the other tool on another piece of work while moving in the reverse direction, a rotary pattern tool mounted on the tool support for shaping the work following the action of either roughing tool, and means for automatically releasing a piece of work at the end of the reciprocation of the tool support in either direction that the alternate roughing action of the roughing tools may be performed on a separate piece of work and the shaping action of the rotary pattern tool may be performed on every piece of work treated by the roughing tools.

6. A machine of the character described, comprising in combination, a head stock spindle and a tail stock spindle for supporting and rotating pieces of stock, a tool carriage, means to reciprocate said carriage, a pair of roughing tools mounted on said carriage at one side of the line of said spindle centers, one of said tools being operable when the carriage is fed in one direction and the other of said tools being operable when the carriage is fed in the opposite direction, and a pattern tool mounted on said carriage intermediate said roughing tool and at the opposite side of the line of said spinde centers.

7. A machine of the character described, comprising in combination, a plurality of head stock spindles, a plurality of tail stock spindles, a tool carriage, means to reciprocate said carriage, a plurality of sets of roughing tools mounted on said carriage, each set comprising a pair of roughing tools, one for operating on the work when the carriage is fed in one direction and the other for operating on the work when the carriage is fed in the opposite direction, and pattern tools mounted on said carriage intermediate said roughing tools, one of said pattern tools being operable on the work following both roughing tools of one pair, and the other pattern tool being operable on the work following both roughing tools of the other pair.

8. A machine of the character described, comprising in combination, a plurality of head stock spindles, a plurality of tail stock spindles, a tool carriage, means to reciprocate said carriage, and a plurality of sets of roughing tools mounted on said carriage, each set comprising a pair of roughing tools, one for operating on the work when the carriage is fed in one direction, and the other for operating on the work when the carriage is fed in the opposite direction.

9. A machine of the character described, having, in combination, means to support and rotate a plurality of pieces of stock, a reciprocating tool carriage, a plurality of roughing tools mounted on said carriage for simultaneously operating on a plurality of pieces of stock as the carriage moves in one direction, a plurality of roughing tools mounted on the carriage for simultaneously operating on other pieces of work as the carriage moves in the other direction, and a plurality of rotary pattern tools mounted on the carriage to roll along and shape the several pieces of stock following the action of the roughing tools as the carriage moves in either direction.

10. A machine of the character described, comprising, in combination, work supporting and rotating means, a pair of roughing tools having their cutting surfaces at one side of the axis of the work supporting and rotating means, one of said roughing tools acting on one piece of work as the tool is fed in one direction and the other roughing tool acting on another piece of work when fed in the opposite direction, and a rotary shaping tool movable with the roughing tools and arranged to act upon the work between the roughing tools and on the opposite side of the axis of the work supporting and rotating means as the tools are moved in either direction.

11. A machine of the character described, comprising in combination, means to support and rotate a plurality of pieces of stock, a tool carriage, means to reciprocate said carriage, a plurality of roughing tools mounted on said carriage for simultaneously operating on a plurality of pieces of stock as said carriage is fed in one direction, and a plurality of roughing tools mounted on said carriage for simultaneously operating on other pieces of stock when said carriage is fed in the opposite direction.

12. A machine of the character described, comprising in combination, means to support and rotate a plurality of pieces of stock, a carriage, a plurality of roughing tools mounted on the carriage at one side of the axis of the work supporting and rotating means, means to reciprocate said carriage, a shaft journaled in bearings on said carriage at the other side of the axis of the work supporting and rotating means, and a plurality of rotary pattern tools mounted on said shaft for simultaneously shaping a plurality of pieces of stock when said carriage is fed in one direction, and for simultaneously shaping a plurality of other pieces of stock when said carriage is fed in the opposite direction.

13. A machine of the character described, comprising in combination, means to support and rotate a plurality of pieces of stock, a carriage, means to reciprocate said carriage, a shaft journaled in bearings on said carriage, a plurality of rotary pattern tools mounted on said shaft for simultaneously shaping a plurality of pieces of stock in each direction of feed of said carriage, and a plurality of sets of roughing tools mounted on said carriage, some tools of said sets being operable on pieces of stock when the carriage is fed in one direction, and other tools of said sets being operable on other pieces of stock when the carriage is fed in the opposite direction.

14. A machine of the character described, comprising in combination, means to support and rotate pieces of stock, a tool carriage, two roughing tools mounted on said carriage, one acting on a piece of work when fed in one direction and the other acting on another piece of work when fed in the opposite direction, a shaft journaled on said carriage intermediate the two roughing tools, and a rotary pattern cutter mounted on said shaft to act upon the work intermediate the roughing tools when fed in either direction, and means for rotating the shaft.

In testimony whereof, I have signed my name to this specification.

HENRY E. COWDREY.

Copies of this patent may be obtained for five cents each, by addressing the "Commissioner of Patents, Washington, D. C."